(12) United States Patent
Williams et al.

(10) Patent No.: US 9,372,571 B2
(45) Date of Patent: Jun. 21, 2016

(54) COMPUTING DEVICE CANVAS INVOCATION AND DISMISSAL

(71) Applicant: Microsoft Technology Licensing, LLC, Redmond, WA (US)

(72) Inventors: Sarah Graham Williams, Seattle, WA (US); Catherine N. Boulanger, Kirkland, WA (US); Yann Florian Daniel Riche, Seattle, WA (US); Hua Wang, Sammamish, WA (US); John G. A. Weiss, Lake Forest Park, WA (US); Anthony Christian Reed, Sammamish, WA (US); Ralf Groene, Kirkland, WA (US); Steven Nabil Bathiche, Kirkland, WA (US); Vincent L. Ball, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 163 days.

(21) Appl. No.: 14/180,224

(22) Filed: Feb. 13, 2014

(65) Prior Publication Data

US 2015/0227253 A1 Aug. 13, 2015

(51) Int. Cl.
| | | |
|---|---|---|
| *G06F 3/045* | (2006.01) | |
| *G06F 3/041* | (2006.01) | |
| *G06F 3/0488* | (2013.01) | |
| *G06F 3/0354* | (2013.01) | |
| *G06F 3/038* | (2013.01) | |
| *G06F 3/0484* | (2013.01) | |
| *G06F 3/0483* | (2013.01) | |

(52) U.S. Cl.
CPC .............. *G06F 3/0416* (2013.01); *G06F 3/038* (2013.01); *G06F 3/03545* (2013.01); *G06F 3/0412* (2013.01); *G06F 3/0483* (2013.01); *G06F 3/0484* (2013.01); *G06F 3/04883* (2013.01)

(58) Field of Classification Search
CPC .............. G06F 3/0416; G06F 3/04883; G06F 4/03545; G06F 3/0483; G06F 3/0412; G06F 3/0484; G06F 3/041; G06F 3/044
USPC .................... 345/173–184; 178/18.01–18.09, 178/19.01–19.06, 20.01–20.04
See application file for complete search history.

(56) References Cited

U.S. PATENT DOCUMENTS 8,610,744 B2* 12/2013 Harris ........................... 345/661
2012/0194486 A1 8/2012 Kajitani et al.
(Continued)

FOREIGN PATENT DOCUMENTS

| WO | WO-2013049286 | 4/2013 |
|---|---|---|
| WO | WO-2013074989 | 5/2013 |

OTHER PUBLICATIONS

"Get to know the Samsung Galaxy Note II", Available at: <http://www.uscellular.com/uscellular/pdf/samsung-note-2-spen-gestures.pdf>, Oct. 2012, 4 Pages.

*Primary Examiner* — Vijay Shankar
(74) *Attorney, Agent, or Firm* — Judy Yee; Micky Minhas

(57) ABSTRACT

A canvas (e.g., a digital page or sheet of paper) on which a user can input data is displayed on a display device of a computing device in response to the canvas being invoked. The canvas can be invoked in different manners, such as by the user activating a switch or button at an "eraser" end of a stylus that mimics a pen/pencil configuration. The user can input any digital data such as notes, drawings, and so forth on the canvas that he or she desires. In response to the canvas being dismissed (e.g., by the user again activating a switch or button at an "eraser" end of a stylus that mimics a pen/pencil configuration), display of the canvas ceases. The digital data input by the user is saved or otherwise processed by the computing device.

20 Claims, 15 Drawing Sheets

(56) References Cited

U.S. PATENT DOCUMENTS

| | | |
|---|---|---|
| 2012/0242603 A1 | 9/2012 | Engelhardt et al. |
| 2012/0327040 A1 | 12/2012 | Simon et al. |
| 2013/0100074 A1 | 4/2013 | Chang et al. |
| 2013/0120281 A1* | 5/2013 | Harris ............................ 345/173 |
| 2014/0267078 A1* | 9/2014 | Kukulski et al. .............. 345/173 |
| 2014/0267339 A1* | 9/2014 | Dowd et al. ................... 345/581 |
| 2014/0337783 A1* | 11/2014 | Allen et al. .................... 715/771 |

* cited by examiner

1400

1402
Determine That A Canvas Has Been Invoked

1404
Display, In Response To Determining That The Canvas Has Been Invoked, The Canvas 1406
Display, Based On User Input While The Canvas Is Displayed, Digital Markings On The Canvas 1408
Determine That The Canvas Has Been Dismissed 1410
Cease, In Response To Determining That The Canvas Has Been Dismissed, Displaying The Canvas

Fig. 14

COMPUTING DEVICE CANVAS INVOCATION AND DISMISSAL

BACKGROUND

As computing technology has advanced, the types of computing devices available to users has grown, and these various types of devices have become increasingly commonplace. Current computing devices provide a significant amount of functionality to users. However, in some situations the process of accessing this functionality can be cumbersome and involve numerous actions or steps. Attempting to access this functionality can thus lead to user frustration and dissatisfaction with their computing devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with one or more aspects, a computing device comprises an input module that is implemented at least partially in hardware and that is configured to receive input to the computing device. The computing device also comprises one or more modules configured to perform operations including determining that a canvas has been invoked and displaying the canvas in response to determining that the canvas has been invoked. The operations also include displaying digital markings on the canvas based on user input while the canvas is displayed, determining that the canvas has been dismissed, and ceasing displaying the canvas in response to determining that the canvas has been dismissed.

In accordance with one or more aspects, a determination is made by a computing device that a canvas has been invoked, and in response to determining that the canvas has been invoked the canvas is displayed by a module of the computing device. Based on user input while the canvas is displayed, a representation of the user input is displayed on the canvas. A determination is also made that the canvas has been dismissed, and in response to determining that the canvas has been dismissed, displaying of the canvas ceases.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures can indicate similar or identical items. Entities represented in the figures can be indicative of one or more entities and thus reference may be made interchangeably to single or plural forms of the entities in the discussion.

FIG. 14 depicts an example procedure implementing the canvas display in response to invoking the canvas in accordance with one or more embodiments.

DETAILED DESCRIPTION

Overview

Computing device canvas invocation and dismissal is described herein. In one or more implementations, techniques are described to display a canvas (e.g., at least one digital page or sheet of paper) on which a user can input data. The canvas is displayed on a display device of a computing device, and is displayed in response to the canvas being invoked (e.g., by the user activating a switch or button at an "eraser" end of a stylus that mimics a pen/pencil configuration). The user can input any digital data such as notes, drawings, and so forth on the canvas that he or she desires, and digital markings representing the input digital data are displayed on the canvas. In response to the canvas being dismissed (e.g., by the user again activating a switch or button at an "eraser" end of a stylus that mimics a pen/pencil configuration), display of the canvas ceases. The digital data input by the user is saved or otherwise processed by the computing device, and this saving and/or other processing can be performed as the user input is received or alternatively at other times.

In one or more implementations, techniques are described to allow a user to invoke the canvas (and thus have the canvas displayed) from anywhere on the computing device. For example, the canvas can be invoked while a lock screen is being displayed, while the computing device is in a low power or sleep mode, while the computing device is displaying a text messaging interface, and so forth. Thus, the techniques described herein allow the computing device and stylus to mimic a conventional paper notepad and pen/pencil. Invocation of the canvas (e.g., by clicking or pressing the switch or button at an "eraser" end of the stylus) results in the canvas being displayed, allowing the user to begin taking notes on the computing device immediately.

In the following discussion, an example environment is first described that can employ the techniques described herein. Example procedures are then described which can be performed in the example environment as well as other environments. Consequently, performance of the example procedures is not limited to the example environment and the example environment is not limited to performance of the example procedures.

Example Environment

Figure 1:
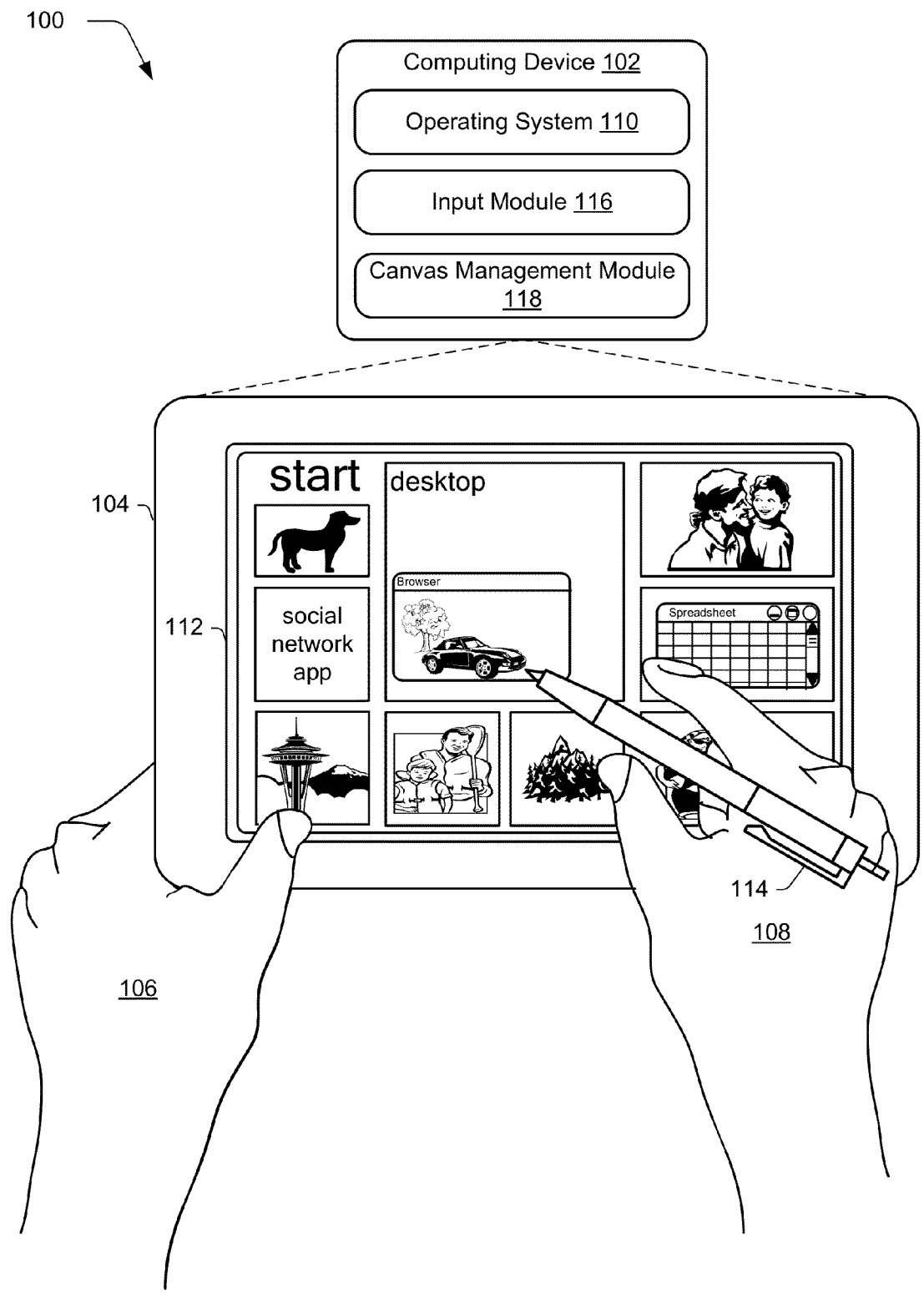
FIG. 1 is an illustration of an environment in an example implementation that is operable to employ techniques described herein in accordance with one or more embodiments.

FIG. 1 is an illustration of an environment 100 in an example implementation that is operable to employ techniques described herein. The illustrated environment 100 includes a computing device 102. The computing device 102 can be configured in a variety of ways. For example, a computing device can be configured as a computer that is capable of communicating over a network, such as a desktop computer, an entertainment appliance, a set-top box communicatively coupled to a display device, a game console, and so forth. The computing device 102 can also be configured as a mobile communications device, such as to include a housing 104 that is configured to be held by one or more hands 106, 108 of a user. For example, a mobile communications device can be configured as a mobile phone, a slate (e.g., tablet), portable music device, portable gaming device, and so on.

Thus, the computing device 102 can range from full resource devices with substantial memory and processor resources (e.g., personal computers, game consoles) to low-resource devices with limited memory and/or processing resources (e.g., traditional set-top boxes, hand-held music devices). Additionally, although a single computing device 102 is shown, the computing device 102 can be representative of a plurality of different devices, such as multiple servers utilized by a business to perform operations such as by a web service, a remote control and set-top box combination, an image capture device and a game console configured to capture gestures, and so on. Further discussion of different configurations that can be assumed by the computing device can be found in relation to FIG. 15.

The computing device 102 is further illustrated as including an operating system 110. The operating system 110 is configured to abstract underlying functionality of the computing device 102 to applications or other software that are executable on the computing device 102. For example, the operating system 110 can abstract the processing system, memory, network, and/or display device 112 functionality of the computing device 102 such that the applications can be written without knowing "how" this underlying functionality is implemented. The application, for instance, can provide data to the operating system 110 to be rendered and displayed by the display device 112 without understanding how this rendering will be performed. Likewise, the operating system 110 can abstract touchscreen functionality of the display device 112 for use by the application. The operating system 108 can also represent a variety of other functionality, such as to manage a file system and user interface that is navigable by a user of the computing device 102.

The computing device 102 can support a variety of different interactions. For example, the computing device 102 can include one or more hardware devices that are manipulable by a user to interact with the device. Examples of such devices include peripheral devices such as a keyboard, cursor control device (e.g., mouse), a stylus 114, and so on.

In the illustrated example, first and second hands 106, 108 of a user are shown. The first hand 106 of the user is shown as holding a housing 104 of the computing device 102. The second hand 108 of the user is illustrated as providing one or more inputs using the stylus 114 that are detected using an input module 116.

The input module 116, for instance, can support touchscreen functionality of the display device 112 to perform an operation, such as to launch an application, draw on the display device 112, perform gestures, and so on. Thus, recognition of the inputs can be leveraged to interact with a user interface output by the computing device 102, such as to interact with a game, an application, browse the internet, change one or more settings of the computing device 102, and so forth. Although a stylus 114 in the configuration of a traditional pen or pencil is shown, the stylus can be implemented using a variety of other types of configurations, such as a traditional paint brush or marker, a triangular prism or other geometric shape, and so on.

The input module 116 can alternatively support various other input mechanisms in addition to and/or in place of the touchscreen functionality. For example, the input module 116 can receive audio or ultrasonic signals from the stylus 114, infrared or ultraviolet signals from the stylus 114, other radio signals from the stylus 114, and so forth, and such signals can be used in conjunction with any of a variety of public and/or proprietary techniques to determine the location and/or movement of the stylus 114, to invoke or dismiss a canvas as discussed in more detail below, and so forth. Regardless of the input mechanisms supported, the input module 116 detects the location and/or movement of the stylus 114, allowing various operations to be input by the user via the stylus 114, including handwritten notes, drawings, and so forth as discussed in more detail below.

The computing device 102 is also illustrated as including a canvas management module 118. The canvas management module 118 is representative of functionality to display a canvas on the display device 112. The canvas displayed on the display device 112 refers to a digital piece or sheet of paper on which the user can input data (e.g., by drawing, writing, and so forth) using the stylus 114 or other input device (e.g., the user's finger). The canvas management module 118 displays the canvas in response to the canvas being invoked, and ceases displaying the canvas in response to the canvas being dismissed. The canvas can be invoked or dismissed in a variety of different manners as discussed in more detail below. Various other operations on the canvas can optionally be supported by the canvas management module 118, such as displaying different digital pieces or sheets of paper, processing digital pieces or sheets of paper (e.g., classifying, sending, etc.), and so forth as discussed in more detail below.

Figure 2:
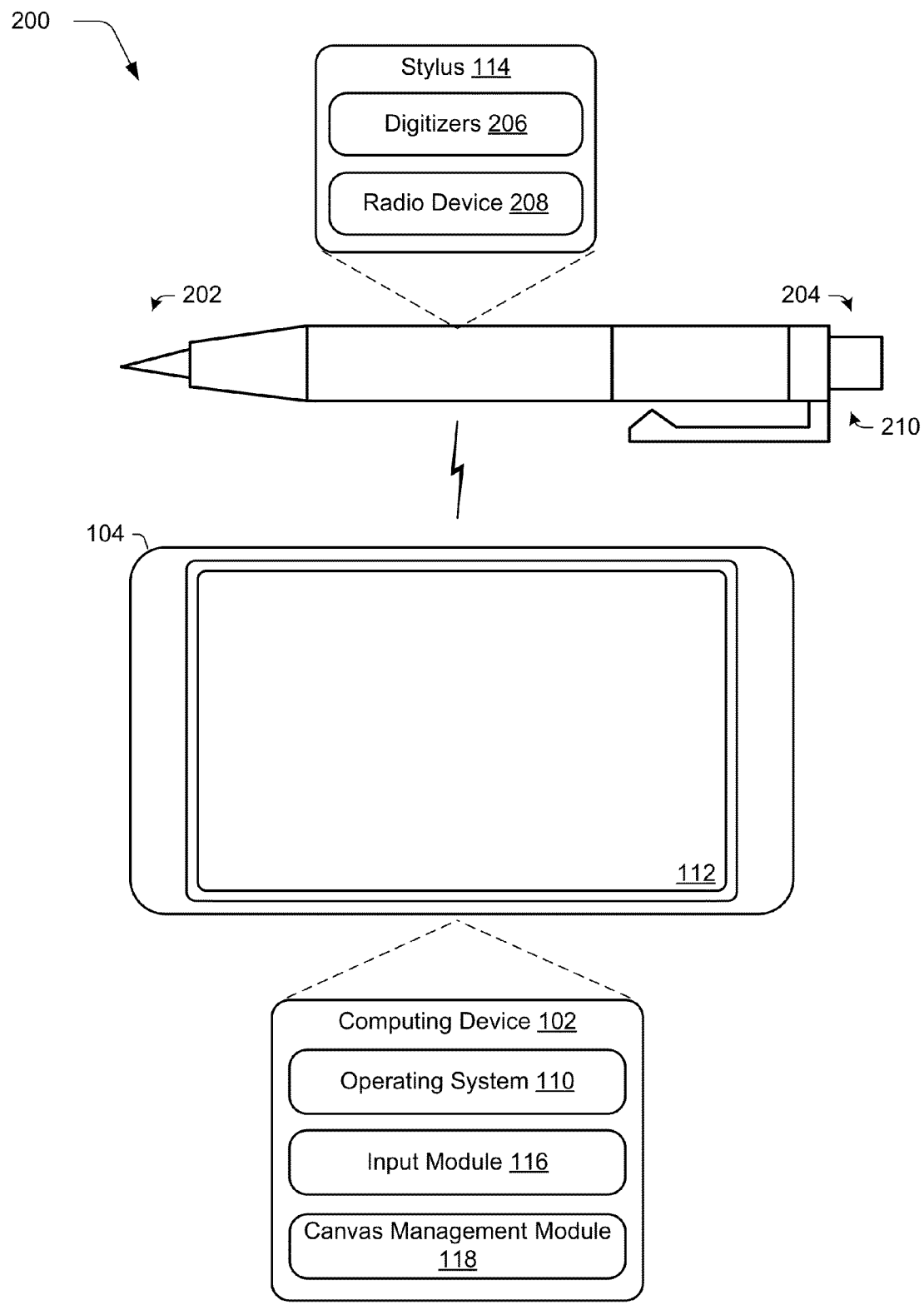
FIG. 2 depicts a system in an example implementation in which a stylus is configured to invoke a canvas of a computing device in accordance with one or more embodiments.

FIG. 2 depicts a system 200 in an example implementation in which a stylus is configured to invoke a canvas of a computing device. The computing device 102 includes an operating system 110, input module 116, and canvas management module 118 as discussed above that are contained within a housing 104 that assumes a mobile configuration.

An example stylus 114 is configured to mimic a retractable pen or mechanical pencil. As such, the stylus 114 can include a first end 202 and a second end 204 that are configured to support different operations in conjunction with the computing device 102. For example, the first end 202 can be configured to write on the display device 112 and the second end 204 (an eraser end) can be configured to invoke or dismiss a canvas of the computing device 102. The stylus 114, for instance, can include a radio device 208 to communicate an indication of invocation or dismissal of the stylus 114 to the computing device 102. The stylus 114 can include a mechanical actuator 210 (e.g., a button) that is selectable by a user and is situated at the second end 204. The actuator 210 can be a toggle switch, and alternately change the stylus 114 between indicating canvas invocation and indicating canvas dismissal each time the actuator 210 is selected (e.g., pressed at least a threshold amount or distance). Each time the actuator 210 is selected, the radio device 208 communicates an indication of invocation or dismissal of the canvas to the computing device 102.

The radio device 208 can be implemented to communicate the indication to the computing device 102 in a variety of different manners, and the computing device 102 configured to receive communication in the manner provided by the radio device 208. For example, the indication can be provided using a Bluetooth protocol, Near Field Communication (NFC) protocols, low energy Wi-Fi signals, infrared signals, audio or ultrasonic signals, and so forth.

Invoking the canvas (indicating canvas invocation) refers to indicating that the canvas management module 118 is to display the canvas on the display device 112 and is to be ready to receive user input to the canvas. When the actuator 210 is selected to change the stylus 114 to indicate canvas invocation, an indication (e.g., message or other signal) that the canvas has been invoked is sent by the radio device 208 to the computing device 102, and in response the canvas management module 118 displays the canvas on the display device 112. Dismissing the canvas (indicating canvas dismissal) refers to indicating that the canvas management module 118 is to cease displaying the canvas on the display device 112. When the actuator 210 is selected to change the stylus 114 to indicate canvas dismissal, an indication (e.g., message or other signal) that the canvas has been dismissed is sent by the radio device 208 to the computing device 102, and in response the canvas management module 118 ceases display of the canvas on the display device 112.

It should be noted that invoking or dismissing the canvas is different from binding or otherwise associating the stylus 114 with the computing device 102. Some communication protocols, such as Bluetooth, include a binding process during which the stylus 114 is bound to the computing device 102, allowing the stylus 114 to communicate with the computing device 102. For such communication protocols, the binding process is performed for the stylus 114, but the binding process is separate from the canvas invocation and dismissal discussed herein. A stylus 114 that is bound to the computing device 102 can be toggled between indicating canvas invocation and indicating canvas dismissal.

The second end 204 of the stylus 114 can also be configured to provide additional functionality, such as to act as an eraser to erase the writing or other portions of a user interface output by the display device 112 of the computing device 102. To recognize the different ends of the stylus 114, different digitizers 206 can be disposed at corresponding ends such that an input module 116 can detect which end of the stylus 114 is disposed proximal to touchscreen functionality of the input module 116 of the computing device 102. In other words, the stylus 114 can be configured to approximate two different pens having different functionality which is detected through the digitizers 206 of the stylus 114.

Figure 3:
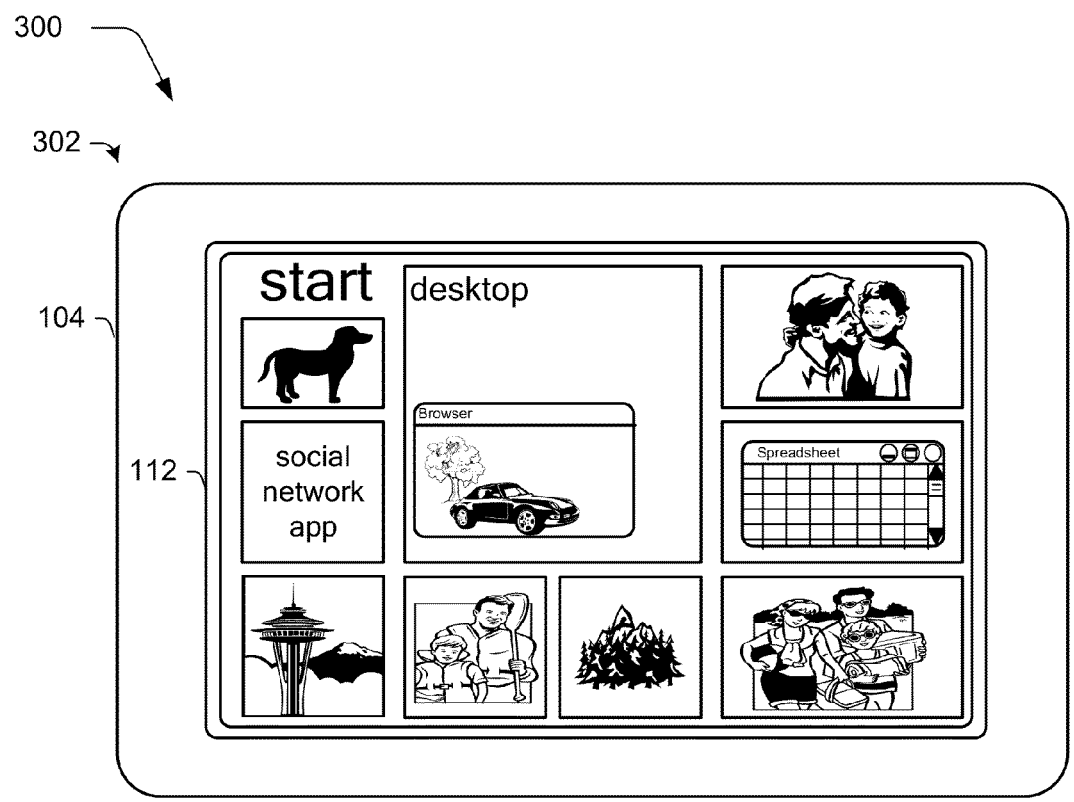
FIGS. 3, 4, 5 and 6 depict an example system implementing the canvas display in response to invoking the canvas in accordance with one or more embodiments.
Figure 3:
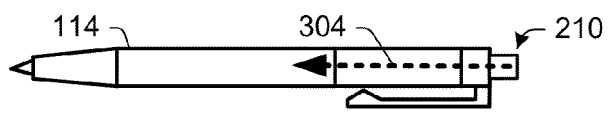

FIGS. 3-6 depict a system 300 in an example implementation in which the stylus 114 includes the mechanical actuator 210. The system 300 includes a computing device 102 configured as a mobile communications device, including the display device 112 in the housing 104. The system 300 is illustrated in FIGS. 3-6 through first, second, third, and fourth stages 302, 402, 502, and 602. At the first stage 302 of FIG. 3, a user interface is displayed on the display device 112 and the user can interact with the user interface in various manners, such as using the stylus 114, using his or her finger, and so forth. In the example of FIG. 3, the user interface displays various portions (e.g., tiles or icons) that can be selected by a user, and can be referred to as start screen or menu, a desktop, and so forth. It should be noted that the user interface displayed in FIG. 3 is an example, and that the user interface displayed can be for any of a variety of different operating systems or other programs (e.g., text messaging programs, word processing programs, games or other recreational programs, audio and/or video playback programs, and so forth).

At the first stage 302, the canvas is invoked by selection of the mechanical actuator 210. The actuator 210 is selected by applying pressure to the actuator 210 in approximately (within a threshold amount of) the direction of dashed line 304. The actuator 210 optionally emits an audible sound (e.g., a "click") in response to the actuator 210 being selected.

In response to selection of the actuator 210 in the first stage 302, an indication that the canvas has been invoked is sent to the computing device. In response to this indication, the canvas is displayed on the display device 112 as illustrated at the second stage 402 of FIG. 4. The canvas is displayed as a digital sheet of paper that covers all of the display device 112 in FIG. 4, although alternatively the canvas can cover less than all of the display device 112.

Figure 4:
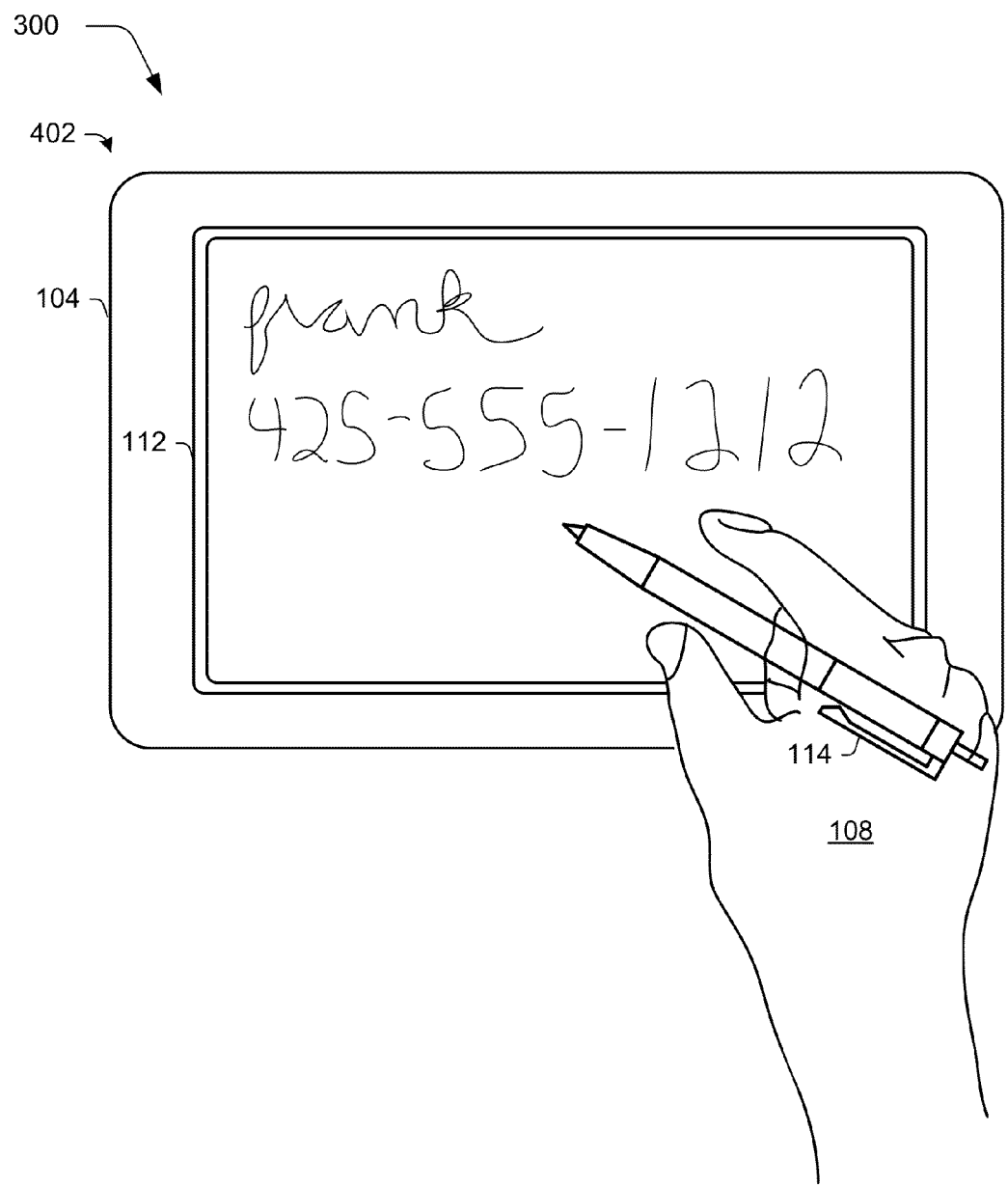

The canvas when initially displayed can be blank, and movement of the stylus 114 results in digital data being input to the computing device, and digital markings based on the input digital data being displayed on the canvas. In the illustrated example of FIG. 4, the canvas is part of a note-taking application, and the digital data being input can be handwritten text, drawings, and so forth. For example, as illustrated in FIG. 4, the user can input the name of a person and his or her phone number.

Figure 5:
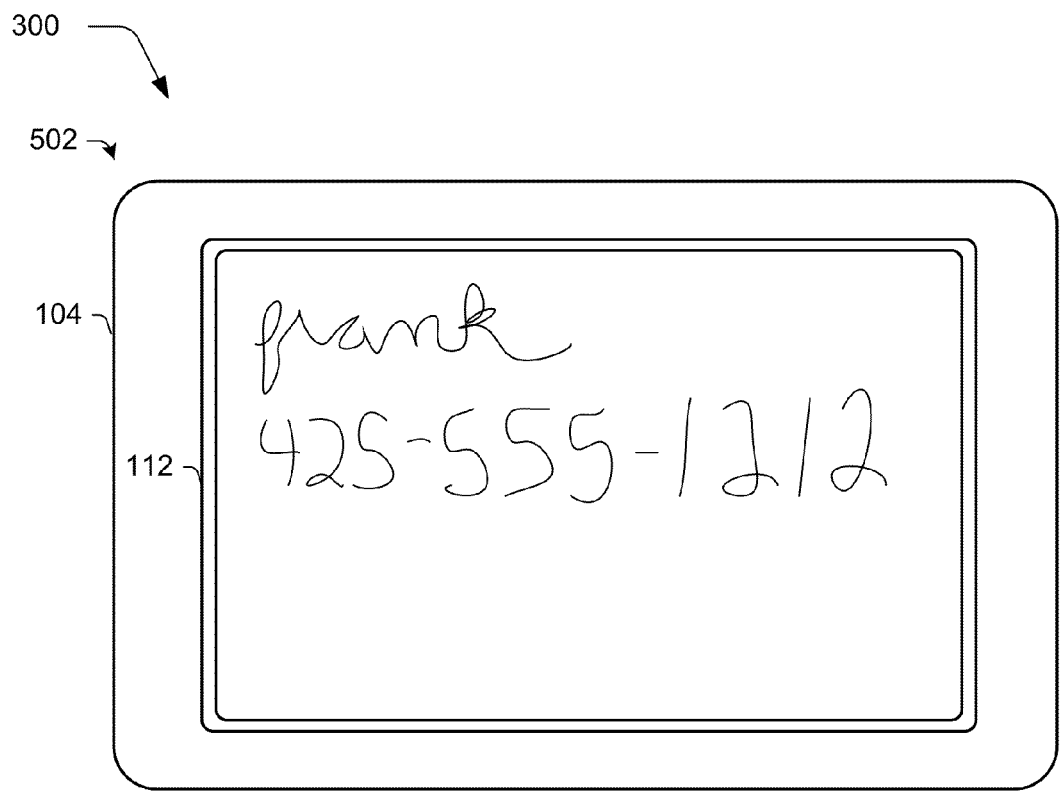
Figure 5:
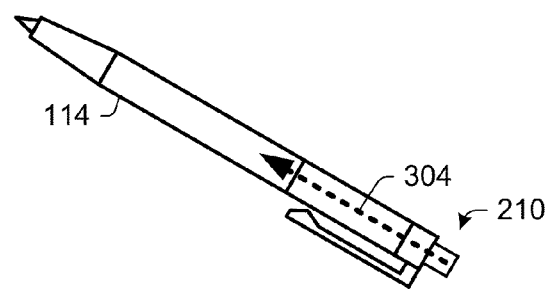
Figure 6:
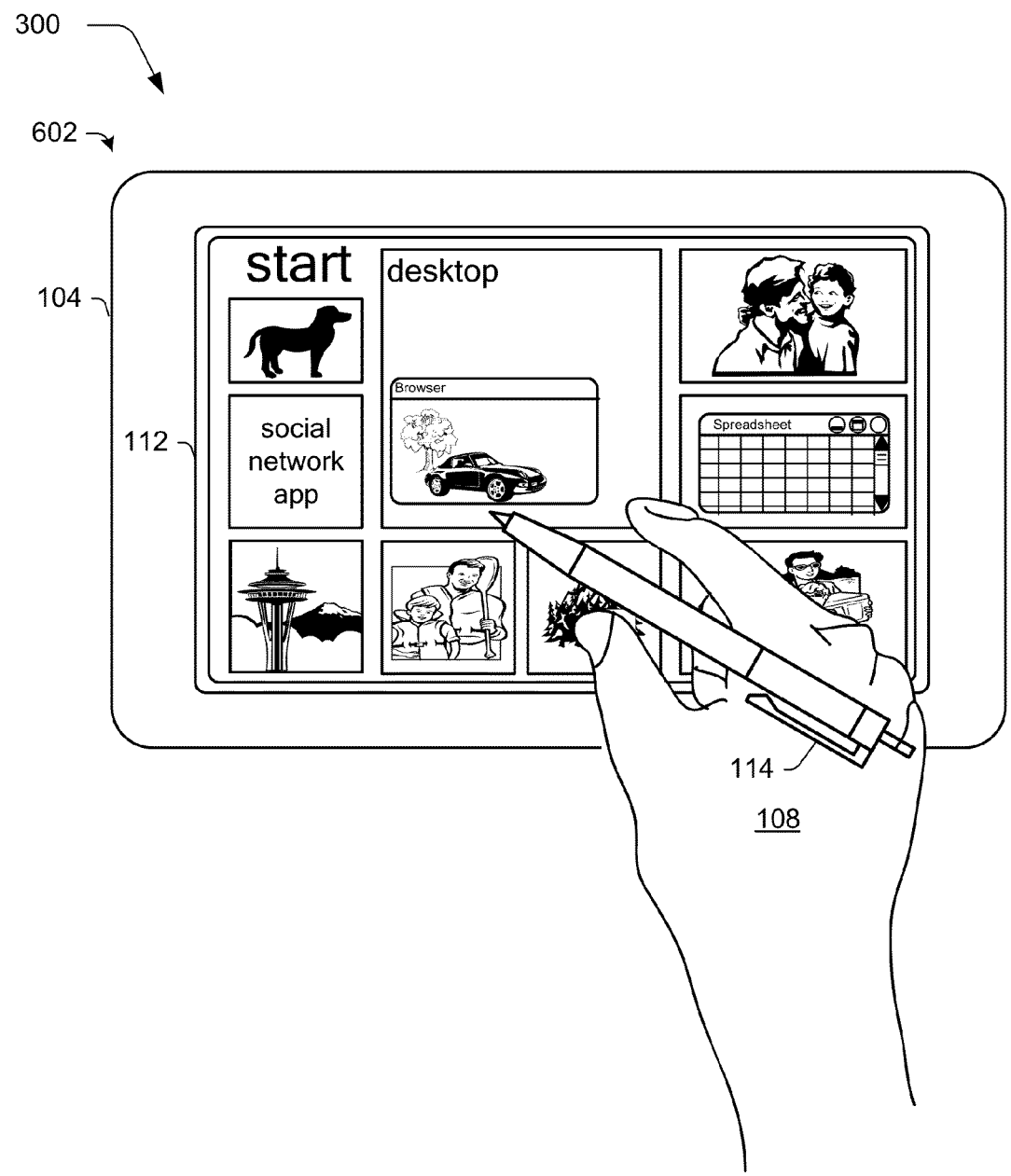

At the third stage 502 of FIG. 5, while the canvas is displayed by the display device 112, the canvas is dismissed. The canvas is dismissed by selection of the mechanical actuator 210. The actuator 210 is selected by applying pressure to the actuator 210 in approximately (within a threshold amount of) the direction of dashed line 304 as discussed above.

In response to selection of the actuator 210 in the third stage 502, an indication that the canvas has been dismissed is sent to the computing device. In response to this indication, display of the canvas ceases, and the display device 112 returns to displaying the user interface that was being displayed prior to invocation of the canvas as illustrated in the fourth stage 602 of FIG. 6. The user can then proceed to interact with the user interface being displayed in any way he or she desires.

FIGS. 7-10 depict a system 400 in an example implementation in which the stylus 114 includes the mechanical actuator 210. The system 400 includes a computing device 102 configured as a mobile communications device, including the display device 112 in the housing 104. The system 400 is illustrated in FIGS. 7-10 through first, second, third, and fourth stages 702, 802, 902, and 1002. The example system illustrated in FIGS. 7-10 is similar to the example system illustrated in FIGS. 3-6. However, in the illustrated example system of FIGS. 3-6, the user interface displays various portions (e.g., tiles or icons) that can be selected by a user, and can be referred to as start screen or menu, a desktop, and so forth, whereas in the example system illustrated in FIGS. 7-10 the user interface displays a lock screen or credential screen.

Figure 7:
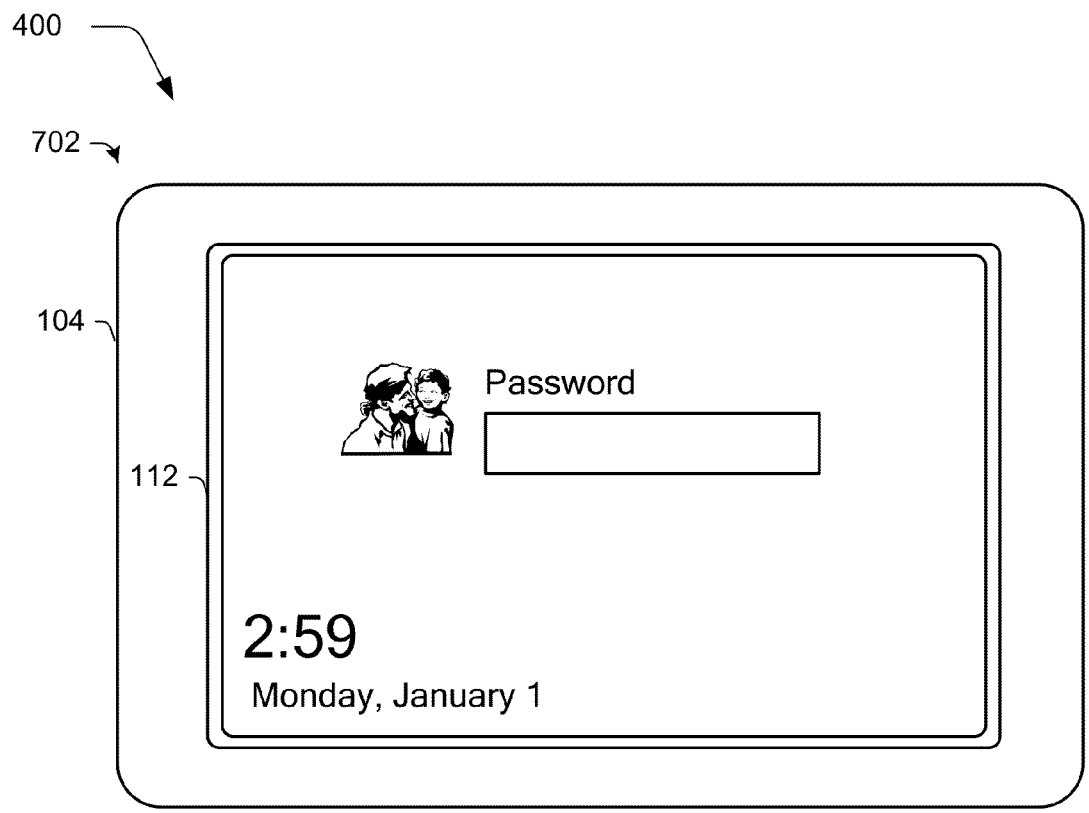
FIGS. 7, 8, 9, and 10 depict another example system implementing the canvas display in response to invoking the canvas in accordance with one or more embodiments.
Figure 7:
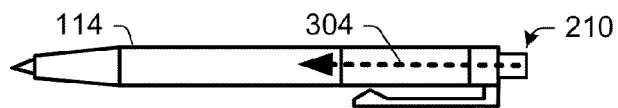

At the first stage 702 of FIG. 7, a user interface is displayed on the display device 112 and the user can interact with the user interface (optionally using the stylus 114). In the example of FIG. 7, the user interface displays a lock or credential screen in which the user is to provide his or her credentials in order to log into or otherwise access additional functionality of the computing device. Generally, if the user does not provide the correct credentials, he or she is not able to log into his or her account on or otherwise access functionality of the computing device, such as the start screen or menu, a desktop, and so forth of FIG. 3.

At the first stage 702, the canvas is invoked by selection of the mechanical actuator 210, analogous to the discussion above regarding the first stage 302 of FIG. 3. In response to selection of the actuator 210 in the first stage 702, an indication that the canvas has been invoked is sent to the computing device. In response to this indication, a canvas is displayed on the display device 112 as illustrated at the second stage 802 of FIG. 8, analogous to the canvas displayed in the second stage 402 of FIG. 4.

Figure 8:
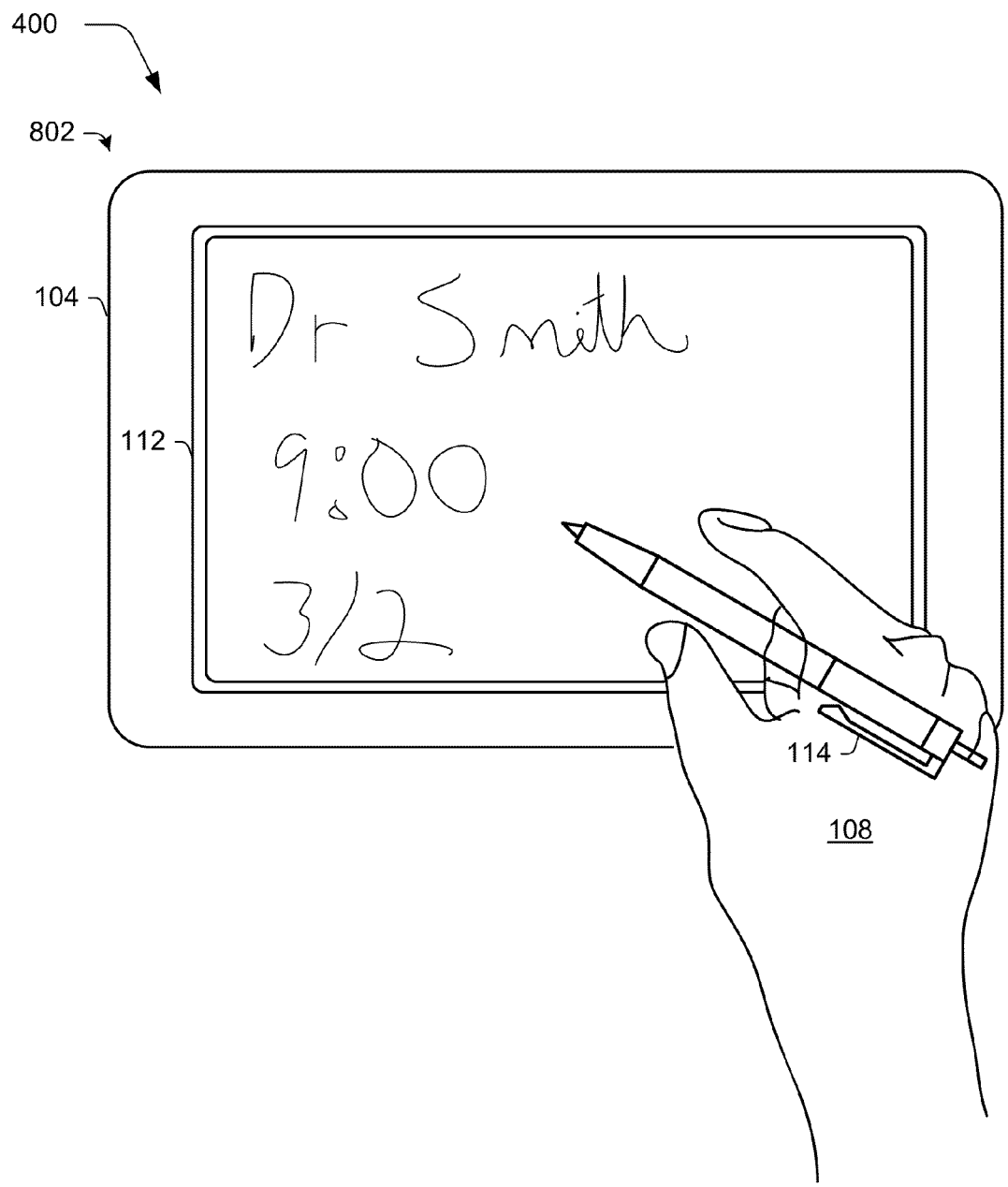

The canvas when initially displayed can be blank, and movement of the stylus 114 results in digital data being input to the computing device, and digital markings displayed on the canvas. In the illustrated example of FIG. 8, the canvas is part of a note-taking application, and the digital data being input can be handwritten text, drawings, and so forth. For example, as illustrated in FIG. 8, the user can input the name, date, and time of a doctor's appointment.

Figure 9:
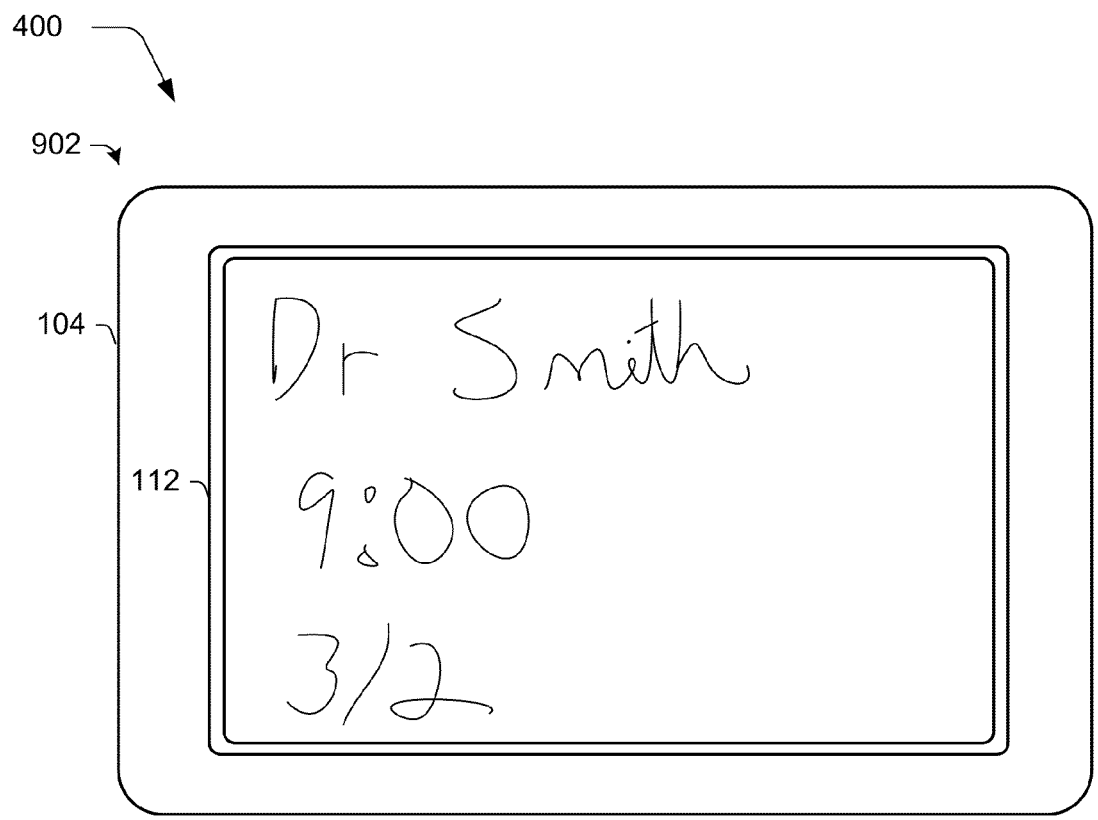
Figure 9:
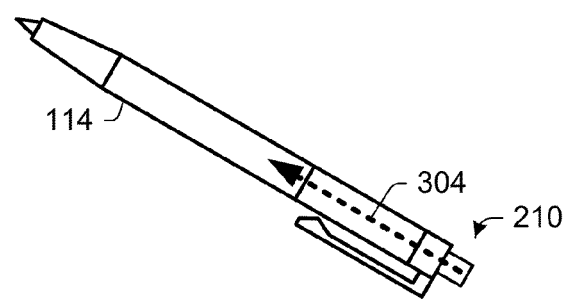
Figure 10:
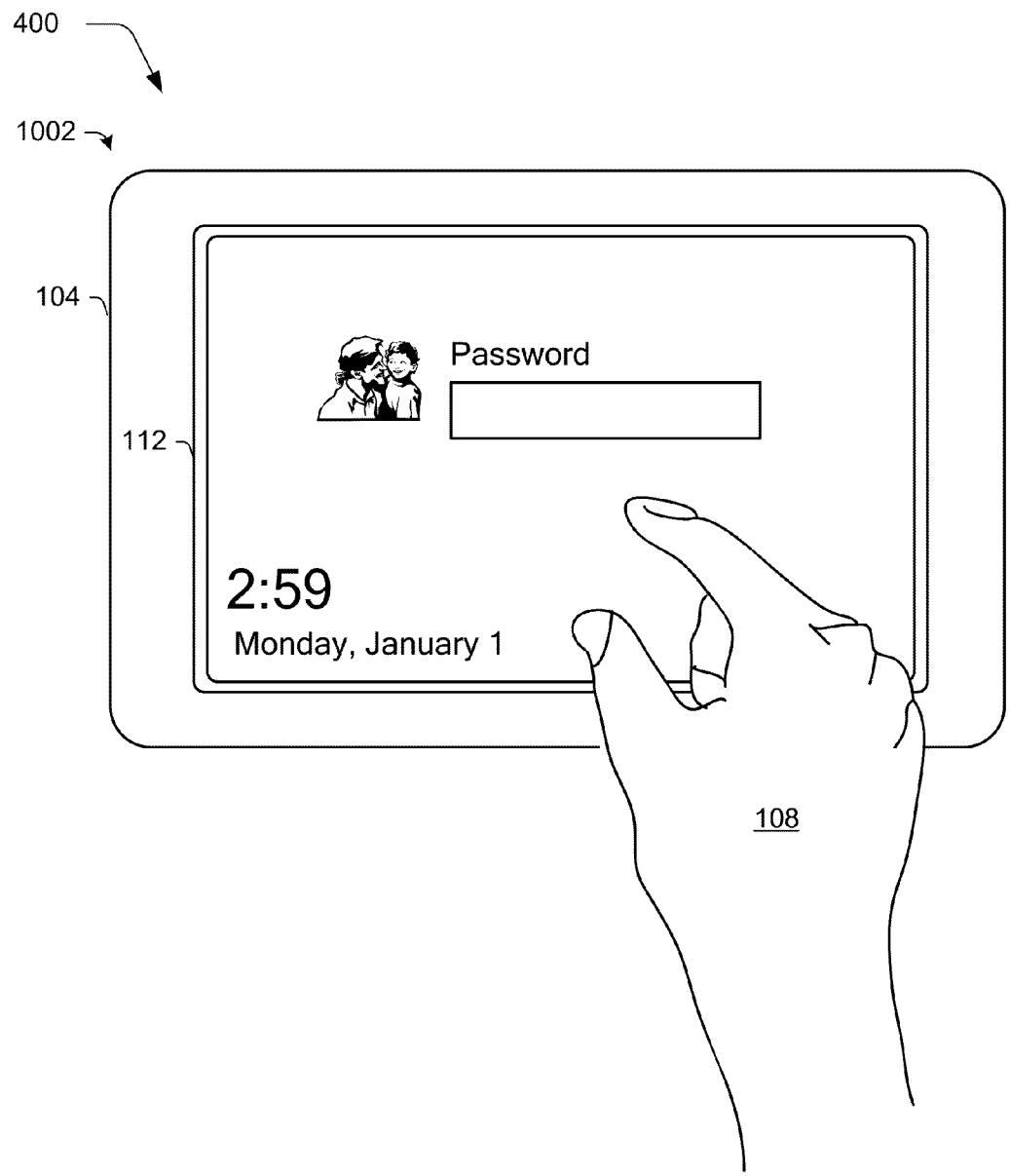

At the third stage 902 of FIG. 9, while the canvas is displayed by the display device 112, the canvas is dismissed. The canvas is dismissed by selection of the mechanical actuator 210, analogous to the discussion above regarding the third stage 502 of FIG. 5. In response to selection of the actuator 210 in the third stage 902, an indication that the canvas has been dismissed is sent to the computing device. In response to this indication, display of the canvas ceases, and the display device 112 returns to displaying the lock screen or credential screen that was being displayed prior to invocation of the canvas as illustrated in the fourth stage 1002 of FIG. 10. The user can then proceed to interact with the lock or credential screen being displayed in any way he or she desires, including providing his or her credentials if desired.

Although a lock or credential screen is displayed in the example system of FIGS. 7-10, it should be noted that the system can perform analogously even though another screen is being displayed or no user interface is being displayed by the display device 112. For example, a screen saver may be displaying images on the display device 112, and in response to various user inputs (e.g., touching the display device 112 or moving a cursor control) a lock or credential screen is displayed. However, the lock or credential screen can be bypassed and the canvas displayed in response to invocation of the canvas (e.g., selection of the actuator 210 while the screen saver is displayed). By way of another example, the display device 112 may be in a lower power mode and displaying no user interface, and in response to various user inputs (e.g., touching the display device 112 or moving a cursor control) a lock or credential screen is displayed. However, the lock or credential screen can be bypassed and the canvas displayed in response to invocation of the canvas (e.g., selection of the actuator 210 while the display device 112 is in a low power mode and displaying no user interface).

Thus, as illustrated in FIGS. 7-10, the user need not be logged into his or her computing device in order to invoke the canvas, input one or more notes or other data on the canvas, and dismiss the canvas. The input module 116 and canvas management module 118 of FIG. 1 of the computing device 102 allow the canvas to be displayed and inputs provided via the stylus 114 in the absence of the user providing credentials to log into or otherwise access the computing device 102. However, the computing device 102 can still prevent other functionality of the computing device 102 from being accessed (e.g., using the stylus 114 or other input mechanisms) if the credentials to log into or otherwise access the computing device 102 have not been provided.

In one or more embodiments, the canvas displayed on the display device 112 supports multiple digital pages or digital sheets of paper. The user can scroll through different pages or sheets of paper in any of a variety of different manners, such as navigation buttons, gestures on the display device 112, audible inputs, and so forth. The user can scroll through pages or sheets of paper on which he or she has previously input data, and/or through blank pages or sheets of paper.

Figure 11:
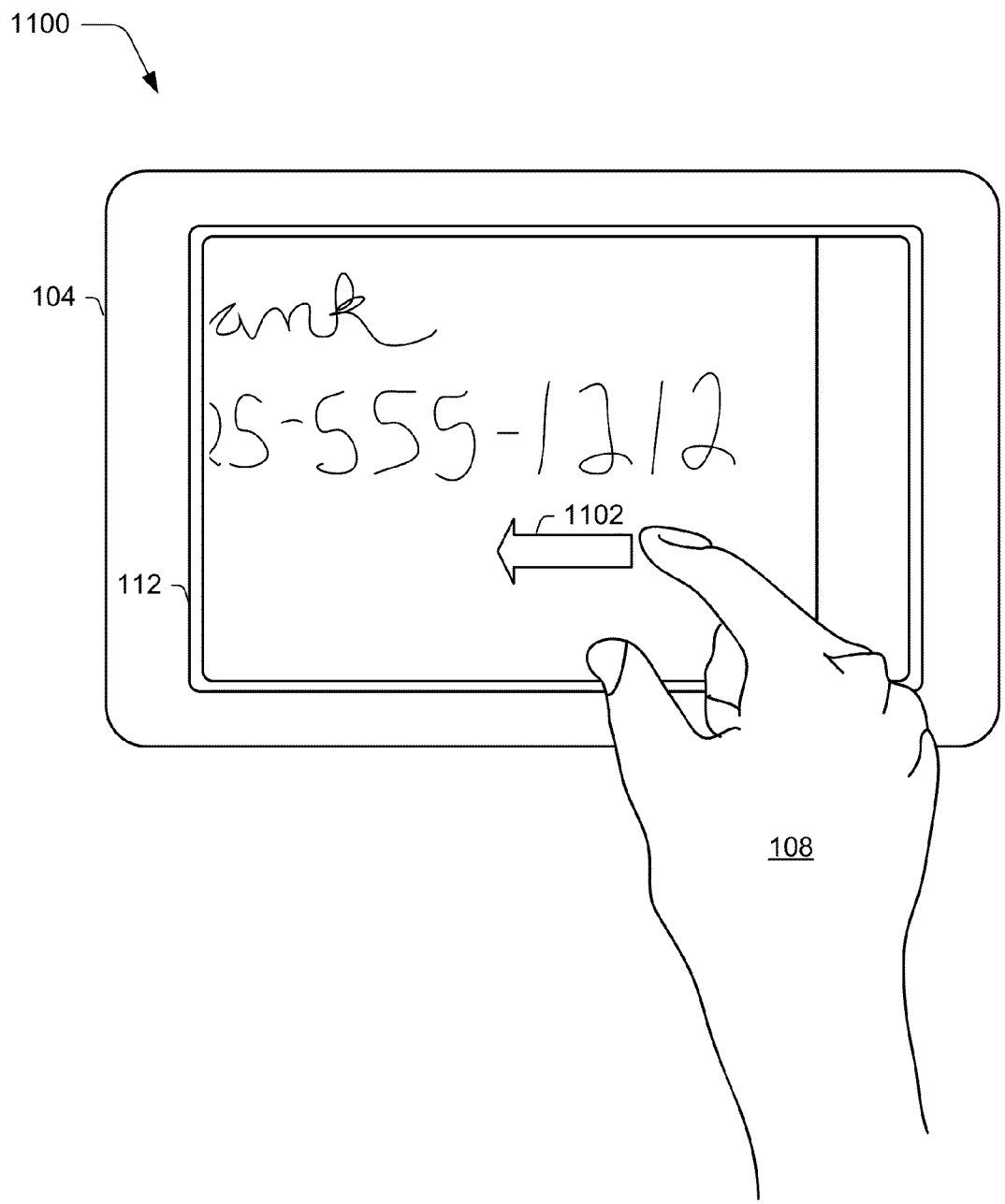
FIGS. 11, 12, and 13 illustrate examples of displaying and scrolling through sheets or pages of a canvas in accordance with one or more embodiments.
Figure 12:
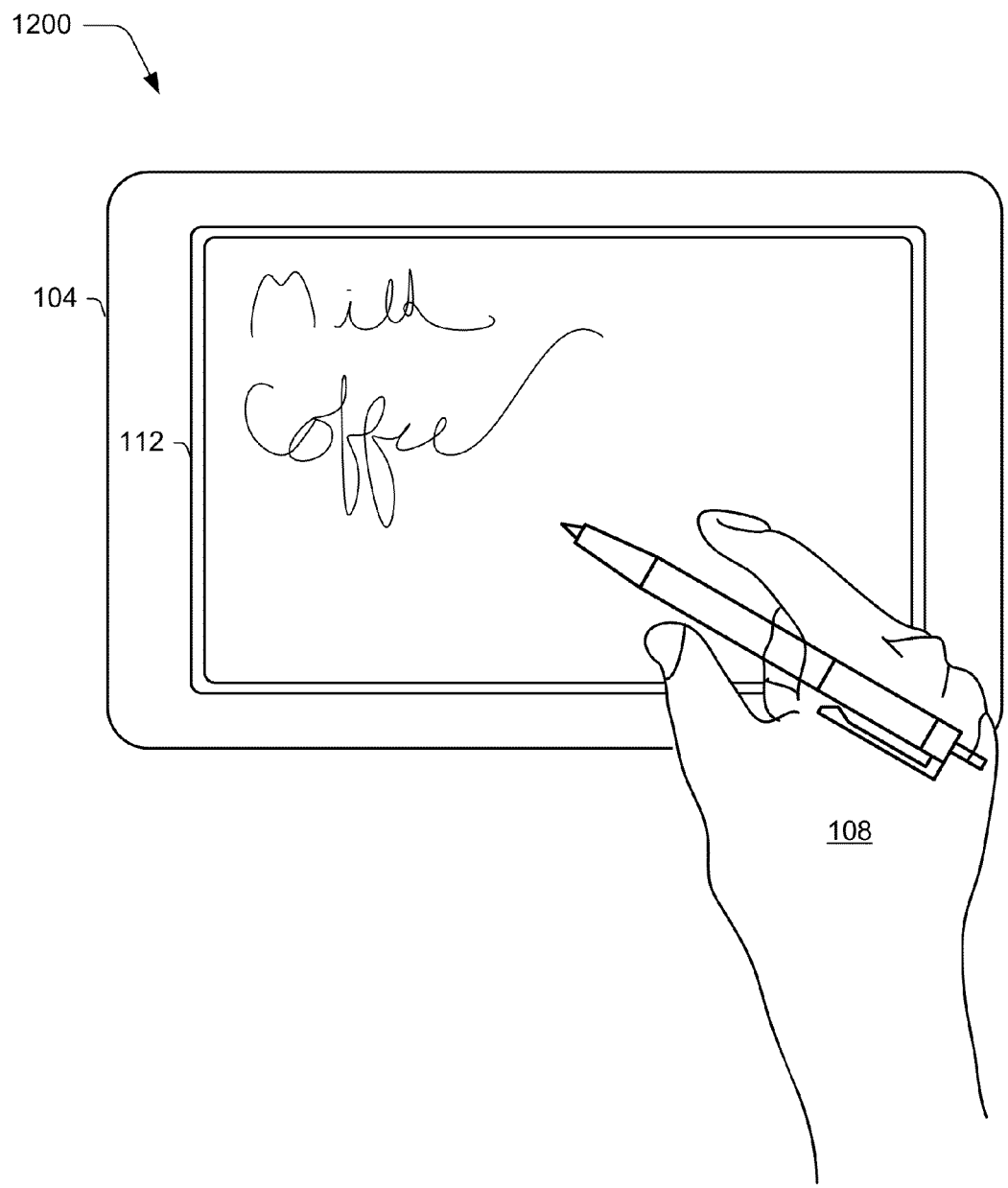

By way of example, assume that the user has input a name and phone number on a sheet of a canvas as illustrated in FIG. 4. The user can input a gesture to scroll to another sheet or page of the canvas, such as by a gesture of swiping the finger of his or her hand 108 at least a threshold distance to the left, as illustrated by arrow 1102 of FIG. 11. Upon completion of the gesture, a blank sheet or page of the canvas is displayed on the display device 112, and the user can input additional digital data on the blank sheet or page of the canvas. For example, as illustrated in FIG. 12, the user can input a list of items to purchase at the grocery store.

Figure 13:
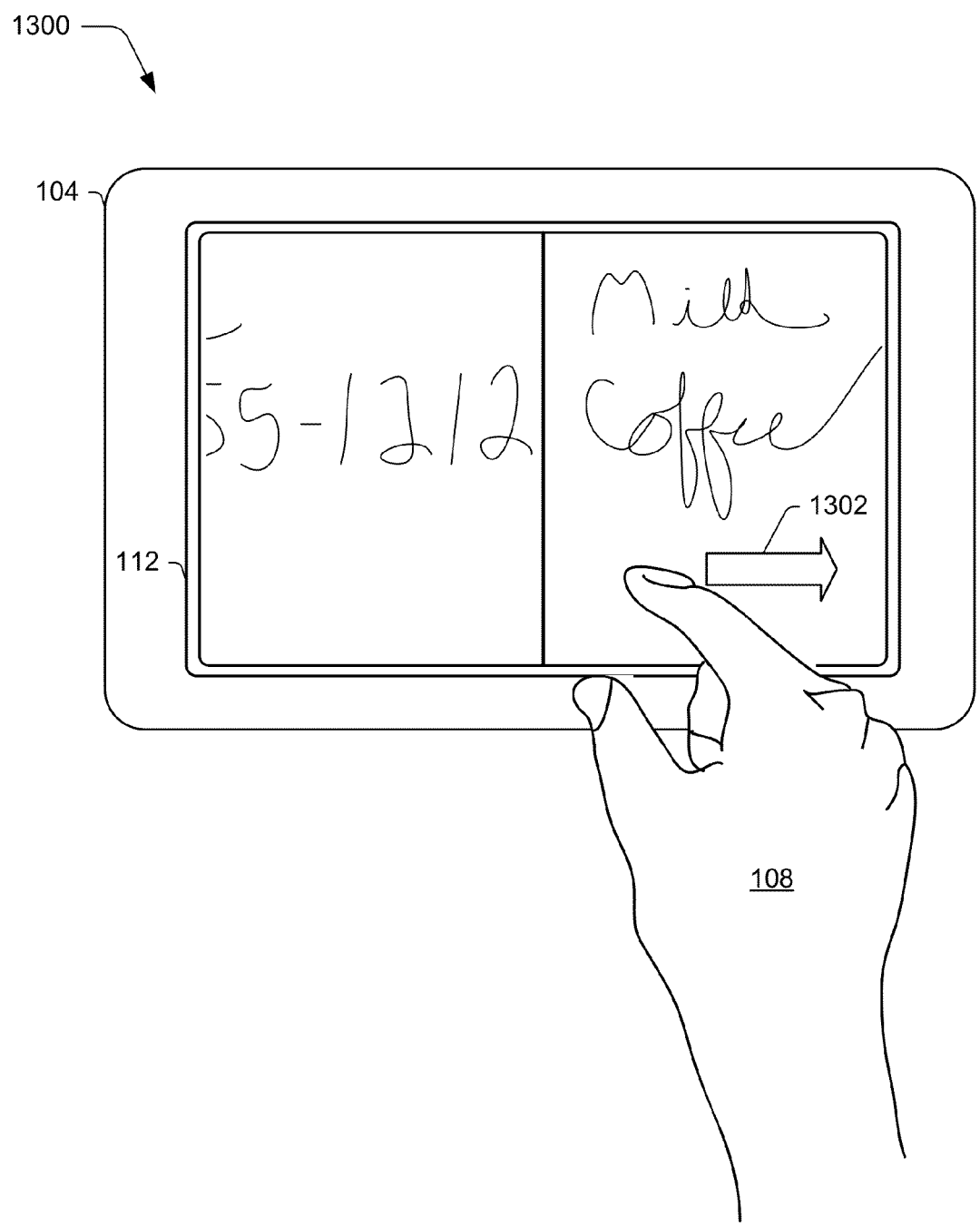

The user can also optionally be allowed to scroll back and forth to different sheets or pages of the canvas. For example, as illustrated in FIG. 13, the user can input a gesture to scroll to a previous sheet or page of the canvas, such as by a gesture of swiping the finger of his or her hand 108 at least a threshold distance to the right as illustrated by arrow 1302. The user can thus scroll back to a different sheet or page of the canvas, in response to which the data previously input to that sheet or page is displayed on the display device 112.

In one or more embodiments, the ability to scroll between different sheets or pages of the canvas is dependent on the state or settings of the computing device when the canvas was invoked. In some situations the canvas management module 118 allows the user to scroll through different sheets or pages of the canvas, and in other situations the canvas management module 118 does not allow the user to scroll (prohibits the user from scrolling) through different sheets or pages of the canvas (or allows the user to scroll through only particular sheets or pages of the canvas).

In one or more implementations, in situations in which the canvas was invoked while the lock screen or credential screen was displayed, while the canvas is displayed (and data input to the canvas can be provided by the user) the canvas management module 118 allows the user to scroll through different sheets or pages of the canvas since the canvas was last invoked, but not other sheets or pages. For example, a session can be created in response to the canvas being invoked, and terminated in response to the canvas being dismissed. The user can scroll through sheets or pages to which the user inputs data during the session (e.g., sheets or pages created during the session), but cannot scroll through sheets or pages to which the user does not input data during the session (e.g., sheets or pages not created during the session). Alternatively, in situations in which the canvas was invoked while the lock screen or credential screen was displayed, the canvas management module 118 does not allow the user to scroll through different sheets or pages of the canvas.

However, if the canvas is dismissed (and the session is terminated), the user can subsequently provide his or her credentials to log into the computing device. After logging into the computing device, the canvas management module 118 can receive user inputs requesting that data previously input to the canvas be displayed, and allow the user to scroll through sheets or pages previously input by the user regardless of when input (and regardless of whether the sheets or pages were input to the canvas that was invoked while the lock screen or credential screen was displayed).

In one or more implementations, in situations in which the canvas was invoked while a user interface other than the lock screen or credential screen was displayed, the canvas management module 118 allows the user to scroll between different sheets or pages of the canvas (regardless of when the sheets or pages were created). Alternatively, in situations in which user credentials need not be input in order to log into or otherwise access additional functionality of the computing device, the canvas management module 118 allows the user to scroll between different sheets or pages of the canvas (regardless of when the sheets or pages were created). For example, if a user has configured the computing device so that he or she need not input credentials in order to log into or otherwise access additional functionality of the computing device, the canvas management module 118 allows the user to scroll between different sheets or pages of the canvas (regardless of when the sheets or pages were created).

Reference is made to invoking the canvas while a desktop, lock screen, and so forth is being displayed on the display device 112. In one or more embodiments, the canvas can also be invoked while the computing device is in a sleep or other low power mode. An indication of the invocation of the canvas can be received by a module of the computing device 102 while the computing device is in a sleep or other low power mode, and the module can transition the computing device to a higher power mode (e.g., wake up the computing device). Once woken up or operating in the higher power mode, the canvas management module 118 can display the canvas as discussed above. The computing device can also optionally be placed in a sleep or low power mode in response to the canvas being dismissed.

The canvas management module 118 can perform any of a variety of different actions with the data input by the user to one or more pages of the canvas. In one or more embodiments, the module 118 saves the pages in a data store (e.g., of the computing device 102, of a remote service, etc.), and the pages can subsequently be retrieved and the user can scroll between the pages as discussed above. For example, the canvas management module 118 can retrieve the pages and display the pages on the display device 112, and allow the user to scroll through pages of the canvas. The pages can be saved in different manners, such as different pages created in response to different invocations of the canvas being different pages of the same file (e.g., the same canvas), or pages created in response to different invocations of the canvas being different files (e.g., different canvases). The data input to the pages can be saved as the data is input and/or at other times (e.g., in response to an indication that the canvas is dismissed).

Alternatively, other actions can be taken. For example, various filters or other rules can be applied to sort or classify the data input to one or more pages of the canvas (e.g., the pages created between the most recent invocation and dismissal of the stylus). By way of another example, one or more pages of the canvas (e.g., the pages created between the most recent invocation and dismissal of the canvas) can be printed, communicated to another device (e.g., via email), and so forth.

By way of another example, the canvas management module 118 can be a module that interacts with one or more other devices separate from the computing device 102, and can communicate various information to such other devices based on the data input by the user to one or more pages of the canvas. For example, the canvas management module 118 can be part of a payment authorization program, and communicate with a purchasing program of another computing device, such as computing device at a cashier stand or checkout of a store or business. The user can enter his or her signature on a page of the canvas in order purchase an item, and the module 118 can communicate that signature to the other computing device to authorize payment by the user, can verify the signature entered by the user and communicate an authorization of payment by the user only if the signature is verified, and so forth.

Alternatively, the canvas management module 118 can support multiple different functionality and/or the computing device 102 can include multiple different canvas management modules 118 that support different functionality. Different functionality can be invoked in different manners, such as by selecting the mechanical actuator 210 a different number of times within a threshold amount of time. For example, one functionality (e.g., note-taking functionality that saves pages of data entered by the user) can be invoked in response to the mechanical actuator 210 being selected once within a threshold amount of time (e.g., 2-3 seconds), and other functionality (e.g., note-taking functionality that prints pages of data entered by the user) can be invoked in response to the mechanical actuator 210 being selecting twice within a threshold amount of time (e.g., 2-3 seconds). Selection of the mechanical actuator 210 within the threshold amount of time is used to determine the functionality being invoked, and selection of the mechanical actuator 210 after the threshold amount of time has elapsed indicates dismissal of the functionality. The threshold amount of time can refer to a total amount of time from the first selection to the last selection (e.g., the selections to indicate which functionality is to be invoked all occur within the threshold amount of time) or alternatively an amount of time between selections (e.g., after the first selection to indicate which functionality is to be invoked, each subsequent selection occurs within a threshold amount of time of the previous selection).

Additionally, although reference is made herein to entering data to one or more pages of the canvas using the stylus 114, data can optionally be entered in various other manners. For example, data can be input via touch inputs of another object (e.g., a user's finger) to the display device 112. By way of another examples, data can be input audibly (e.g., via a microphone of the computing device 102), visually (e.g., via a camera of the computing device 102), and so forth.

Furthermore, reference is made herein to the stylus 114 communicating an indication to the computing device 102 in response to the canvas being invoked or dismissed. This indication can be sent a single time or multiple times. For example, the indication of the canvas being invoked can be sent by the stylus at regular or irregular intervals (e.g., every 2-5 seconds), so if an action is performed (e.g., selection of a button on the stylus 114) that would result in the canvas being displayed but the stylus is not within range of the computing device 102, the indication will be sent to the computing device 102 when the stylus 114 subsequently comes within range of the computing device 102 (assuming the button has not again been selected to result in dismissing of the canvas before the stylus subsequently comes within range of the computing device 102).

In the discussions above, reference is also made to the canvas being invoked or dismissed in response to selection of a mechanical actuator 210 situated at one end of the stylus. Alternatively, the canvas can be invoked or dismissed in response to various other actions or buttons. For example, the actuator 210 may not be mechanical, but may sense selection in other manners (e.g., heat or pressure). By way of another example, the actuator 210 can be situated in different locations, such as being a button along the side (rather than at the end) of the stylus. By way of another example, the canvas can be invoked by removing a cap from one end of the stylus (e.g., as sensed by one or more sensors in the stylus and/or cap) and dismissed by replacing the cap on the end of the stylus, by removing a cap from one end of the stylus and placing the cap on the other end of the stylus (e.g., as sensed by one or more sensors in the stylus and/or cap) and dismissed by replacing the cap on the one end, and so forth.

The canvas can alternatively be invoked or dismissed in response to other actions, and the stylus need include no actuator 210. For example, a particular portion of or location on the housing 104 (e.g., on the display device 112 or elsewhere) referred to as an inkwell can be used to invoke or dismiss the canvas. The stylus touching the inkwell (e.g., with the first end 202) is sensed (by the computing device and/or the stylus), and the canvas is invoked or dismissed in response to the stylus touching the inkwell. By way of another example, the canvas can be invoked or dismissed in response to the stylus touching the inkwell followed by the stylus touching one or more other particular portions of the computing device (e.g., on the housing 104, on the display device 112, or elsewhere) within a threshold amount of time (e.g., 3-5 seconds). By way of yet another example, the canvas can be invoked or dismissed in response to the stylus touching the inkwell concurrently with (or within a threshold amount of time of) a touching of one or more other particular portions of the computing device (e.g., on the housing 104, on the display device 112, or elsewhere). E.g., the canvas can be invoked or dismissed in response to the stylus touching the inkwell concurrently with a user's finger touching one or more other particular portions of the computing device.

By way of another example, the canvas can be invoked or dismissed by selection (e.g., touching or pressing) a button on the computing device 102. An indication that the canvas has been invoked or dismissed can optionally be communicated from the computing device 102 to the stylus. By way of another example, the canvas can be invoked by positioning the stylus within a threshold distance (e.g., 10-15 inches) of the computing device 102, and dismissed by positioning the stylus beyond the threshold distance of the computing device. The proximity of the stylus to the computing device can be detected by the computing device and/or the stylus. In this example, moving the stylus close to (within the threshold distance of) the computing device causes the canvas to be automatically invoked.

In the discussions herein, the same action (e.g., selection of the mechanical actuator 210) is discussed as invoking and dismissing the stylus—the stylus is dismissed when the action is next performed subsequent to invocation of the stylus, and invoked when the action is next performed subsequent to dismissal of the stylus. It should be noted, however, that alternatively different actions or buttons can be used to invoke the stylus than are used to dismiss the stylus.

The techniques discussed herein provide a variety of different usage scenarios. For example, if the user desires to jot down a quick note or write down something quickly before it slips his or her mind, the user can simply invoke the canvas by pressing a button at one end of the stylus. A page of the canvas is quickly and automatically displayed, the user can write what he or she desires, and then dismiss the canvas by pressing the button again. Whatever the user wrote down is saved by the note-taking application, and the user was not troubled with logging into his or her computing device, running the note-taking application, and so forth. All the user did to activate the program was press the button on the stylus.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Example Procedures

The following discussion describes the computing device canvas invocation and dismissal techniques that can be implemented utilizing the previously described systems and devices. Aspects of each of the procedures can be implemented in hardware, firmware, software, or a combination thereof. The procedures are shown as a set of acts that specify operations performed by one or more devices and are not necessarily limited to the orders shown for performing the operations by the respective acts. In portions of the following discussion, reference will be made to the previous figures.

FIG. 14 depicts a procedure 1400 in an example implementation. In procedure 1400, a determination is made that a canvas has been invoked (act 1402). The canvas can be invoked in a variety of different manners, such as selection of a button on the stylus, as discussed above. In one or more embodiments, the determination is made by receiving an indication from the stylus that the canvas has been invoked.

In response to determining that the canvas has been invoked, the canvas is displayed (act 1404). The canvas is one or more digital pages or sheets to which the user can provide input, such as drawing, writing, and so forth. The canvas is displayed in act 1404 with a blank page or sheet to which the user can provide input. Although referred to as a blank page or sheet, it should be noted that some data or markings may already be on the sheet (e.g., a header or footer, a page number, a watermark, etc.).

Based on user input while the canvas is displayed, digital markings are displayed on the canvas (act 1406). The digital markings are representative of the input provided by the user. The input can be provided in various manners as discussed above, such as movement of the stylus, a user's finger touching a display device, and so forth.

A determination is also made that the canvas has been dismissed (act 1408). The canvas can be dismissed in a variety of different manners, such as selection of a button on the stylus, as discussed above. In one or more embodiments, the determination is made by receiving an indication from the stylus that the canvas has been dismissed.

In response to determining that the canvas has been dismissed, display of the canvas ceases (act 1410). Various other actions can also be taken as discussed above, such as saving the pages or sheets of the canvas, printing pages or sheets of the canvas, communicating pages or sheets of the canvas to another device, and so forth.

The procedure 1400 can be performed multiple times. Each time the procedure 1400 is performed, one or more blank pages or sheets of the canvas are displayed to which the user can provide input. Thus, the canvas can end up having numerous pages created at different times.

Example System and Device

Figure 15:
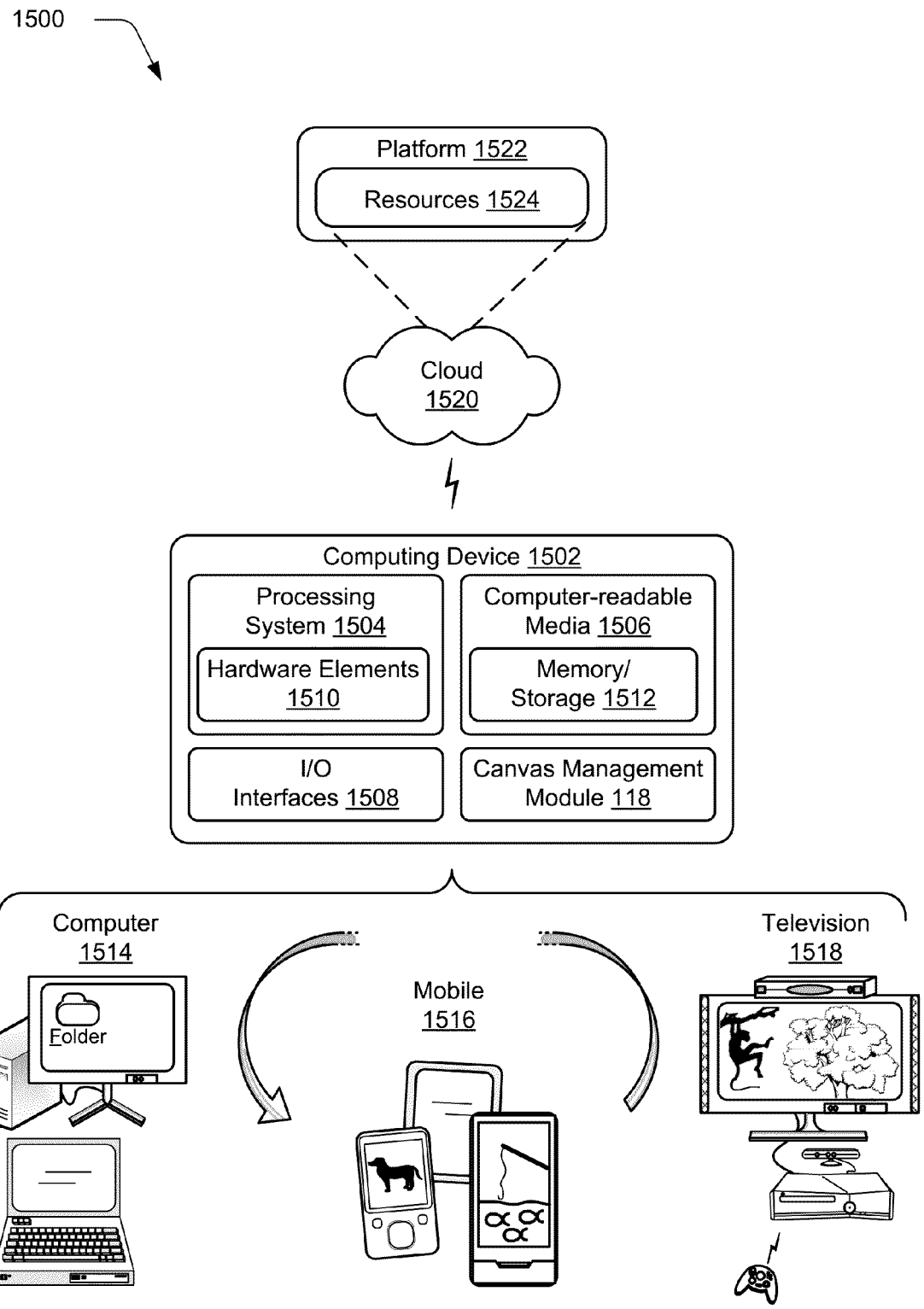
FIG. 15 illustrates an example system that includes an example computing device that is representative of one or more computing systems and/or devices that can implement the various techniques described herein.

FIG. 15 illustrates an example system generally at 1500 that includes an example computing device 1502 that is representative of one or more computing systems and/or devices that can implement the various techniques described herein. The computing device 1502 can be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1502 as illustrated includes a processing system 1504, one or more computer-readable media 1506, and one or more I/O interface 1508 that are communicatively coupled, one to another. Although not shown, the computing device 1502 can further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that can be configured as processors, functional blocks, and so forth. This can include implementation in hardware as an application specific integrated circuit or other logic device formed using one or more semiconductors. The hardware elements 1510 are not limited by the materials from which they are formed or the processing mechanisms employed therein. For example, processors can be comprised of semiconductor(s) and/or transistors (e.g., electronic integrated circuits (ICs)). In such a context, processor-executable instructions can be electronically-executable instructions.

The computer-readable storage media 1506 is illustrated as including memory/storage 1512. The memory/storage 1512 represents memory/storage capacity associated with one or more computer-readable media. The memory/storage component 1512 can include volatile media (such as random access memory (RAM)) and/or nonvolatile media (such as read only memory (ROM), Flash memory, optical disks, magnetic disks, and so forth). The memory/storage component 1512 can include fixed media (e.g., RAM, ROM, a fixed hard drive, and so on) as well as removable media (e.g., Flash memory, a removable hard drive, an optical disc, and so forth). The computer-readable media 1506 can be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which can employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 can be configured in a variety of ways to support user interaction.

The computing device 1502 also includes a canvas management module 118. Canvas management module 118 provides support for the computing device canvas invocation and dismissal techniques discussed herein.

Various techniques can be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques can be implemented on a variety of commercial computing platforms having a variety of processors.

An implementation of the described modules and techniques can be stored on or transmitted across some form of computer-readable media. The computer-readable media can include a variety of media that can be accessed by the computing device 1502. By way of example, and not limitation, computer-readable media can include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media can include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which can be accessed by a computer.

"Computer-readable signal media" refers to a signal-bearing medium that is configured to transmit instructions to the hardware of the computing device 1502, such as via a network. Signal media typically can embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that can be employed in some embodiments to implement at least some aspects of the techniques described herein, such as to perform one or more instructions. Hardware can include components of an integrated circuit or on-chip system, an application-specific integrated circuit (ASIC), a field-programmable gate array (FPGA), a complex programmable logic device (CPLD), and other implementations in silicon or other hardware. In this context, hardware can operate as a processing device that performs program tasks defined by instructions and/or logic embodied by the hardware as well as a hardware utilized to store instructions for execution, e.g., the computer-readable storage media described previously.

Combinations of the foregoing can also be employed to implement various techniques described herein. Accordingly, software, hardware, or executable modules can be implemented as one or more instructions and/or logic embodied on some form of computer-readable storage media and/or by one or more hardware elements 1510. The computing device 1502 can be configured to implement particular instructions and/or functions corresponding to the software and/or hardware modules. Accordingly, implementation of a module that is executable by the computing device 1502 as software can be achieved at least partially in hardware, e.g., through use of computer-readable storage media and/or hardware elements 1510 of the processing system 1504. The instructions and/or functions can be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices can be interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices can have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1516, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1516 class of device that includes mobile devices, such as a mobile phone, portable music player, portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. This functionality may also be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or Wi-Fi network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
    an input module implemented at least partially in hardware, configured to receive input to the computing device;
    one or more modules configured to perform operations including:
        receiving an indication from a stylus that a canvas has been invoked by selection of a button on the stylus;
        displaying the canvas in response to the indication that the canvas has been invoked, the displaying including bypassing a lock screen or credential screen to display the canvas in the absence of user credentials being provided by a user of the computing device;
        displaying, based on user input while the canvas is displayed, digital markings on the canvas;
        receiving an indication from the stylus that the canvas has been dismissed by subsequent selection of the button; and
        ceasing, in response to determining that the canvas has been dismissed, displaying the canvas.

2. A method implemented in a computing device, the method comprising:
    displaying a canvas in response to a stylus touching an inkwell portion of a housing of a display device of the computing device;
    displaying, based on user input while the canvas is displayed, a representation of the user input on the canvas;
    determining that the canvas has been dismissed; and
    ceasing, in response to determining that the canvas has been dismissed, displaying the canvas.

3. A method as described in claim 2, the displaying the canvas further comprising displaying the canvas in response to the stylus touching the inkwell portion of the housing followed by the stylus touching an additional particular portion of the computing device within a threshold amount of time.

4. A method as described in claim 2, the canvas being one or more digital pages of a note-taking application.

5. A computing device as described in claim 1, the receiving an indication that a canvas has been invoked comprising receiving an indication from the stylus that the canvas has been invoked by selection of the button situated at an eraser area of the stylus.

6. A computing device as described in claim 1, the lock screen or credential screen comprising a screen in which the user is to provide user credentials in order to log into the computing device.

7. A computing device as described in claim 1, the canvas being at least one digital page of multiple digital pages of a note-taking application, and the operations further comprising prohibiting the user from scrolling through one or more of the multiple digital pages.

8. A computing device comprising:
an input module implemented at least partially in hardware, configured to receive input to the computing device;
one or more modules configured to perform operations including:
determining, in response to selection of a button on a stylus, that a canvas has been invoked;
displaying the canvas in response to determining that the canvas has been invoked;
displaying, based on user input while the canvas is displayed, digital markings on the canvas;
determining that the canvas has been dismissed; and
ceasing, in response to determining that the canvas has been dismissed, displaying the canvas.

9. A computing device as described in claim 8,
the determining that the canvas has been invoked comprising receiving, from the stylus, an indication that the button has been selected; and
the determining that the canvas has been dismissed comprising receiving, from the stylus, an indication that the button has again been selected.

10. A computing device as described in claim 8, the canvas being invoked by selection of the button situated at an eraser area of the stylus.

11. A computing device as described in claim 8, different functionality of the one or more modules being invoked based on a number of times the button is selected within a threshold amount of time.

12. A computing device as described in claim 8, the canvas being one or more digital pages of a note-taking application.

13. A computing device as described in claim 8, the one or more modules being part of a purchasing program, and further communicating the digital markings to another device.

14. A computing device as described in claim 8, the operations further including allowing a user to scroll through multiple pages of the canvas.

15. A computing device as described in claim 14, the operations further prohibiting the user from scrolling through multiple pages of the canvas in response to determining that the canvas has been invoked while a lock screen or credential screen is displayed by the computing device.

16. A computing device as described in claim 8, the operations further including determining that the canvas has been invoked while a lock screen or credential screen is displayed by the computing device, and displaying the canvas and the digital markings in the absence of user credentials being provided by the user.

17. A computing device as described in claim 8, the operations further including the canvas being invoked while the computing device is in a sleep mode, and waking the computing device in response to the canvas being invoked.

18. A method as described in claim 2, further comprising determining that the canvas has been dismissed in response to the stylus subsequently touching the inkwell portion of the housing while the canvas is displayed.

19. A method as described in claim 2, further comprising:
receiving an indication that the canvas has been invoked while the computing device is in a sleep mode; and
waking the computing device in response to receiving the indication.

20. A method as described in claim 2, further comprising in response to the stylus touching the inkwell portion of the housing, bypassing a lock screen or credential screen to display the canvas and the digital markings in the absence of user credentials being provided by a user of the computing device.

* * * * *